(12) United States Patent
Matsuhara et al.

(10) Patent No.: US 11,276,900 B2
(45) Date of Patent: Mar. 15, 2022

(54) NONAQUEOUS ELECTROLYTE SECONDARY BATTERY AND METHOD OF PRODUCING THE SAME

(71) Applicant: TOYOTA JIDOSHA KABUSHIKI KAISHA, Toyota (JP)

(72) Inventors: Shinsuke Matsuhara, Miyoshi (JP); Kazuhisa Takeda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/782,241

(22) Filed: Oct. 12, 2017

(65) Prior Publication Data

US 2018/0114970 A1     Apr. 26, 2018

(30) Foreign Application Priority Data

Oct. 26, 2016 (JP) .............................. JP2016-209449

(51) Int. Cl.
| | |
|---|---|
| *H01M 50/449* | (2021.01) |
| *H01M 10/0587* | (2010.01) |
| *H01M 4/62* | (2006.01) |
| *H01M 10/04* | (2006.01) |
| *H01M 50/46* | (2021.01) |
| *H01M 10/0565* | (2010.01) |
| *C08G 65/08* | (2006.01) |

(52) U.S. Cl.
CPC ........... *H01M 50/449* (2021.01); *H01M 4/62* (2013.01); *H01M 4/622* (2013.01); *H01M 10/0431* (2013.01); *H01M 10/0565* (2013.01); *H01M 10/0587* (2013.01); *H01M 50/461* (2021.01); *C08G 65/08* (2013.01); *H01M 2300/0085* (2013.01)

(58) Field of Classification Search
None
See application file for complete search history.

(56) References Cited

U.S. PATENT DOCUMENTS

| | | | | |
|---|---|---|---|---|
| 8,178,237 | B2* | 5/2012 | Ugawa | H01M 4/621 |
| | | | | 429/217 |
| 9,219,278 | B2* | 12/2015 | Takahata | H01M 10/0566 |
| 10,044,067 | B2* | 8/2018 | Iwama | H01M 10/052 |
| 2005/0095504 | A1 | 5/2005 | Kim et al. | |
| 2007/0009803 | A1* | 1/2007 | Kim | H01M 50/403 |
| | | | | 429/251 |
| 2008/0305394 | A1 | 12/2008 | Hisamitsu et al. | |

(Continued)

FOREIGN PATENT DOCUMENTS

| | | |
|---|---|---|
| CN | 101320823 A | 12/2008 |
| JP | 2000251920 A | 9/2000 |

(Continued)

*Primary Examiner* — Jonathan Crepeau
*Assistant Examiner* — Angela J Martin
(74) *Attorney, Agent, or Firm* — Sughrue Mion, PLLC (57) ABSTRACT

A nonaqueous electrolyte secondary battery includes a flat wound electrode body that includes a positive electrode sheet, a negative electrode sheet, and a separator sheet, and a nonaqueous electrolyte. The wound electrode body includes a filling layer containing a thermal polymerization product of a resin having electrolyte solution swellability between the negative electrode sheet and the separator sheet.

16 Claims, 4 Drawing Sheets

(56) References Cited

U.S. PATENT DOCUMENTS

| | | | | |
|---|---|---|---|---|
| 2014/0011082 A1* | 1/2014 | Yamamoto | ......... | H01M 10/058 |
| | | | | 429/203 |
| 2014/0234704 A1* | 8/2014 | Kamizori | ............. | H01M 4/525 |
| | | | | 429/200 |
| 2015/0357648 A1* | 12/2015 | Sugimoto | ............ | H01M 4/139 |
| | | | | 429/217 |
| 2018/0248222 A1* | 8/2018 | Iwama | ............. | H01M 10/0587 |
| 2018/0287215 A1* | 10/2018 | Matsui | ............... | H01M 10/441 |

FOREIGN PATENT DOCUMENTS

| | | | | | |
|---|---|---|---|---|---|
| JP | 2005142156 | | * | 6/2005 | .............. B05D 3/02 |
| JP | 2005142156 A | * | | 6/2005 | ........... B05D 3/02 |
| JP | 2005142156 A | | | 6/2005 | |
| JP | 2009016340 | | * | 6/2005 | .............. B05D 3/02 |
| JP | 2009-016340 | | * | 1/2009 | ....... H01M 10/0565 |
| JP | 2009-16340 A | | | 1/2009 | |
| JP | 2009016340 | | * | 1/2009 | ........ H01M 10/0565 |
| JP | 2010-287513 A | | | 12/2010 | |
| KR | 1020050041661 A | | | 5/2005 | |

\* cited by examiner

NONAQUEOUS ELECTROLYTE SECONDARY BATTERY AND METHOD OF PRODUCING THE SAME

INCORPORATION BY REFERENCE

The disclosure of Japanese Patent Application No. 2016-209449 filed on Oct. 26, 2016 including the specification, drawings and abstract is incorporated herein by reference in its entirety.

BACKGROUND

1. Technical Field

The present disclosure relates to a nonaqueous electrolyte secondary battery and a method of producing the same, and specifically, to a nonaqueous electrolyte secondary battery including a flat wound electrode body and a method of producing the same.

2. Description of Related Art

In one typical example of a nonaqueous electrolyte secondary battery mounted in a vehicle or the like, a flat wound electrode body is accommodated in a battery case together with a nonaqueous electrolyte. The flat wound electrode body is produced such that, for example, a band-like positive electrode sheet including a positive electrode active material layer and a band-like negative electrode sheet including a negative electrode active material layer are wound with a band-like separator sheet therebetween, and are additionally pressed and bent to be flat (refer to Japanese Patent Application Publication No. 2010-287513 (JP 2010-287513 A)).

SUMMARY

However, according to investigation by the inventors, in a nonaqueous electrolyte secondary battery including a flat wound electrode body, substances derived from charge carriers (for example, Li) are likely to precipitate locally on a negative electrode. For example, relatively large stress is applied to a portion (wound R portion) that is greatly bent when the flat wound electrode body is produced compared to a portion (flat wound portion) that is less deformed. Thus, for example, wrinkles are generated in a separator at a boundary portion between the wound R portion and the flat wound portion, and a large gap may be formed locally between the negative electrode and the separator. In a portion with a large gap, a distance between positive and negative electrodes increases, and electrical resistance becomes relatively higher. As a result, in the portion, reception of charge carriers in the negative electrode is not sufficient, and substances derived from charge carriers may precipitate on the negative electrode.

The present disclosure provides a nonaqueous electrolyte secondary battery which includes a flat wound electrode body and in which precipitation of substances derived from charge carriers on a negative electrode is prevented.

According to an aspect of the present disclosure, there is provided a nonaqueous electrolyte secondary battery including a flat wound electrode body that includes a positive electrode sheet, a negative electrode sheet, and a separator sheet arranged between the positive electrode sheet and the negative electrode sheet, and a nonaqueous electrolyte, wherein the wound electrode body includes a filling layer containing a thermal polymerization product of a resin having electrolyte solution swellability between the negative electrode sheet and the separator sheet.

According to the above configuration, the filling layer fills a gap between the negative electrode and the separator, and thus it is possible to reduce a difference in distance between positive and negative electrodes. Accordingly, a charging and discharging reaction can be relatively uniformized compared to a battery without the filling layer. As a result, it is possible to appropriately prevent precipitation of substances derived from charge carriers on the negative electrode.

The filling layer may be formed integrally with at least one of the negative electrode sheet and the separator sheet. Thereby, it is possible to reduce a difference in a distance between positive and negative electrodes more appropriately, and it is possible to increase precipitation resistance with respect to substances derived from charge carriers to a higher degree.

The filling layer may be formed integrally with the negative electrode sheet.

The filling layer may be formed integrally with the separator sheet.

The filling layer that is in a state of being independent of the negative electrode sheet and the separator sheet may be arranged between the negative electrode sheet and the separator sheet.

The nonaqueous electrolyte may include a polymerization agent used when a resin included in the filling layer is thermally polymerized, for example, at least one of a polymerization initiator, a chain transfer agent, and a polymerization terminator.

A weight average molecular weight of the thermal polymerization product of the resin having electrolyte solution swellability may be 10,000 to 1,000,000.

A weight per unit area of the filling layer may be 0.2 $mg/cm^2$ or more.

The resin having electrolyte solution swellability may be polyethylene oxide.

According to an aspect of the present disclosure, there is provided a method of producing a nonaqueous electrolyte secondary battery, including, preparing a flat wound electrode body that includes a positive electrode sheet, a negative electrode sheet, and a separator sheet arranged between the positive electrode sheet and the negative electrode sheet; accommodating the wound electrode body in which a filling layer including a resin having electrolyte solution swellability is interposed between the negative electrode sheet and the separator sheet and a nonaqueous electrolyte in a battery case to produce an assembly; and warming the assembly in which the nonaqueous electrolyte includes at least one of a polymerization initiator, a chain transfer agent, and a polymerization terminator and thermally polymerizing the resin included in the filling layer.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

An embodiment of the present disclosure will be described below with reference to the drawings appropriately. Here, components other than those particularly mentioned in this specification that are necessary for implementation of the present disclosure (for example, components not characterizing the present disclosure and a general battery producing process for a battery) can be recognized by those skilled in the art as design matters based on the related art in the field. The present disclosure can be implemented based on content disclosed in this specification and common general technical knowledge in the field. In addition, in the following drawings, members and portions that perform the same operations are denoted with the same reference numerals, and redundant descriptions may be omitted or simplified. The sizes (a length, a width, a thickness, and the like) in the drawings do not necessarily reflect actual sizes.

First Embodiment

Figure 1:
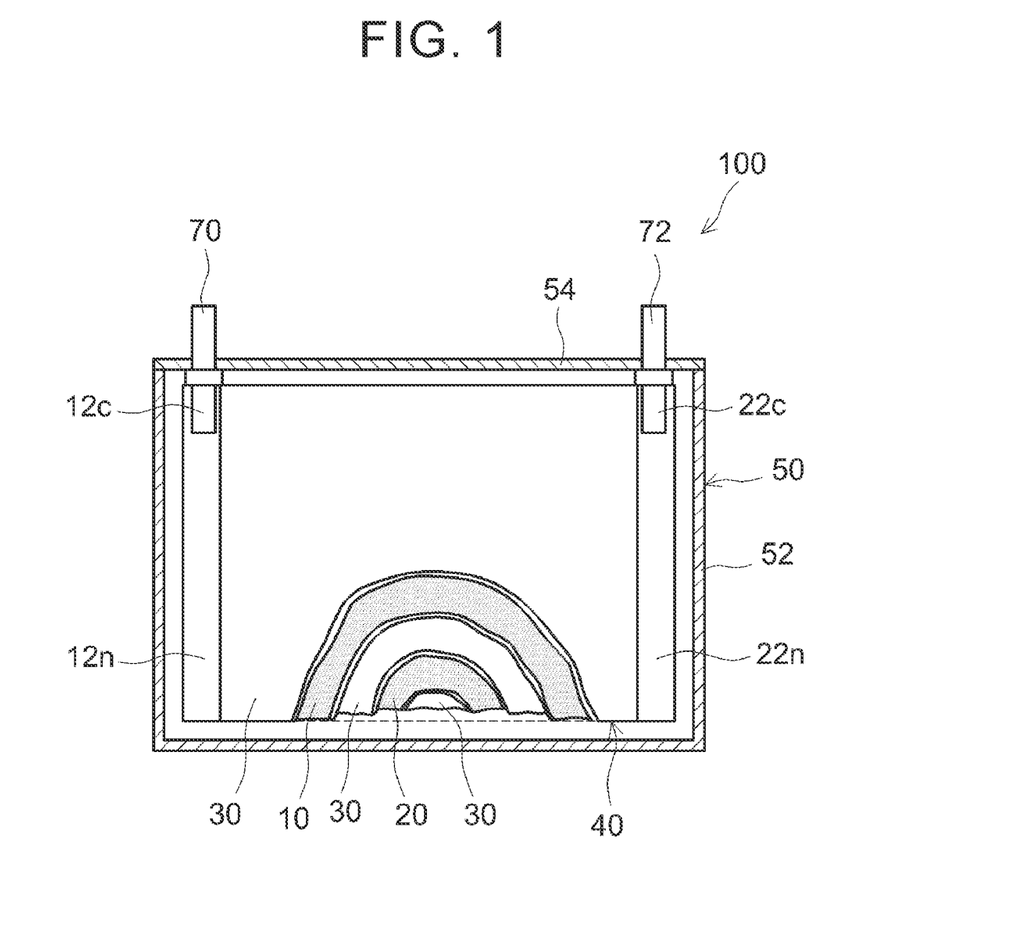
FIG. 1 is a cross-sectional view schematically showing an internal structure of a nonaqueous electrolyte secondary battery according to an embodiment.

FIG. 1 is a cross-sectional view schematically showing an internal structure of a nonaqueous electrolyte secondary battery according to an embodiment. A nonaqueous electrolyte secondary battery 100 shown in FIG. 1 has a configuration in which a wound electrode body 40 and a nonaqueous electrolyte (not shown) are accommodated in a battery case 50.

The battery case 50 includes a rectangular parallelepiped (rectangular) battery case body 52 having an upper end that is open and a bottom and a cover plate 54 for closing the opening. A positive electrode terminal 70 and a negative electrode terminal 72 for external connection are provided in the cover plate 54.

Figure 2:
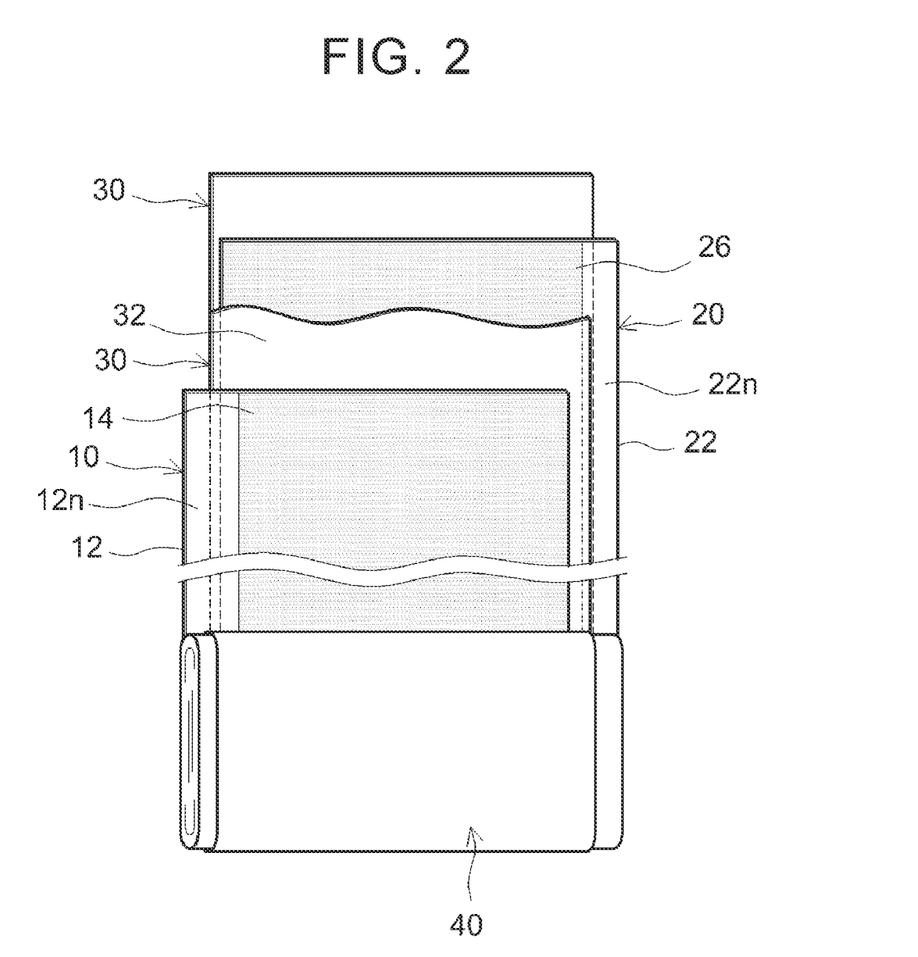
FIG. 2 is a schematic diagram showing a configuration of the wound electrode body of FIG. 1.
Figure 3:
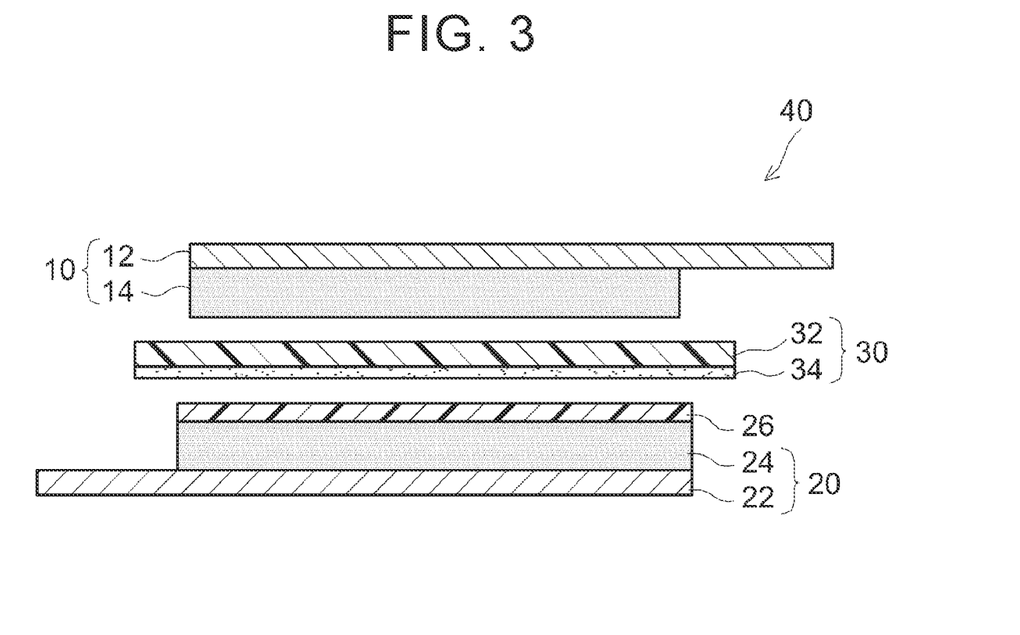
FIG. 3 is a schematic diagram showing a partial cross-sectional structure of the wound electrode body of FIG. 1.

FIG. 2 is a schematic diagram showing a configuration of the wound electrode body 40. FIG. 3 is a schematic diagram showing a partial cross-sectional structure of the wound electrode body 40. The wound electrode body 40 includes a band-like positive electrode sheet 10, a band-like negative electrode sheet 20, and a band-like separator sheet 30. A filling layer 26 is arranged on a surface of the negative electrode sheet 20. The wound electrode body 40 is formed by laminating the positive electrode sheet 10 and the negative electrode sheet 20 including the filling layer 26 with the separator sheet 30 therebetween and winding them in a longitudinal direction. An appearance of the wound electrode body 40 has a flat shape. The wound electrode body 40 has a substantially rounded rectangular shape in a cross section orthogonal to a winding axis.

The positive electrode sheet 10 includes a band-like positive electrode current collector 12 and a positive electrode active material layer 14 formed on a surface thereof. As the positive electrode current collector 12, a conductive member made of a metal having favorable conductivity (for example, aluminum and nickel) is preferable. The positive electrode active material layer 14 is formed with a predetermined width on a surface of the positive electrode current collector 12 in the longitudinal direction. At one end (the left side in FIG. 1 and FIG. 2) of the positive electrode current collector 12 in a width direction, a positive electrode active material layer non-forming portion 12*n* in which the positive electrode active material layer 14 is not formed is provided. The positive electrode sheet 10 is electrically connected to the positive electrode terminal 70 through a positive electrode current collector plate 12*c* provided in the positive electrode active material layer non-forming portion 12*n*.

The positive electrode active material layer 14 includes a positive electrode active material. As the positive electrode active material, lithium transition metal composite oxides, for example, $LiNiO_2$, $LiCoO_2$, $LiMn_2O_4$, $LiNi_{1/3}Co_{1/3}Mn_{1/3}O_2$, and $LiNi_{0.5}Mn_{1.5}O_4$, are preferable. The positive electrode active material layer 14 may include components other than the positive electrode active material, for example, a conductive material and a binder. As the conductive material, carbon materials, for example, carbon black (for example, acetylene black and Ketjenblack), activated carbon, and graphite, are exemplified. As the binder, for example, a halogenated vinyl resin such as polyvinylidene fluoride (PVdF) and a polyalkylene oxide such as polyethylene oxide (PEO) are exemplified.

The negative electrode sheet 20 includes a band-like negative electrode current collector 22 and a negative electrode active material layer 24 formed on a surface thereof. As the negative electrode current collector 22, a conductive member made of a metal having favorable conductivity (for example, copper and nickel) is preferable. The negative electrode active material layer 24 is formed with a predetermined width on a surface of the negative electrode current collector 22 in the longitudinal direction. At one end (right side in FIG. 1 and FIG. 2) of the negative electrode current collector 22 in the width direction, a negative electrode active material layer non-forming portion 22*n* in which the negative electrode active material layer 24 is not formed is provided. The negative electrode sheet 20 is electrically connected to the negative electrode terminal 72 through a negative electrode current collector plate 22*c* provided in the negative electrode active material layer non-forming portion 22*n*.

The negative electrode active material layer 24 includes a negative electrode active material. As the negative electrode active material, for example, a graphite carbon material such as natural graphite, artificial graphite, and amorphous coated graphite (in a form in which amorphous carbon is applied to surfaces of graphite particles) is preferable. The negative electrode active material layer 24 may include components other than the negative electrode active material, for example, a thickener and a binder. As the thickener, for example, celluloses such as carboxymethyl cellulose (CMC) and methylcellulose (MC) are exemplified. As the binder, for example, rubbers such as styrene butadiene rubber (SBR) and a halogenated vinyl resin such as polyvinylidene fluoride (PVdF) are exemplified.

As shown in FIG. 3, the negative electrode sheet 20 of the present embodiment includes the filling layer 26 on a surface on the side that does not face the negative electrode current collector 22 of the negative electrode active material layer 24. In other words, the filling layer 26 is physically adhered to and integrated with the negative electrode active material layer 24 of the negative electrode sheet 20. When the filling layer 26 is provided on the negative electrode sheet 20, it is possible to prevent precipitation of substances derived from charge carriers on the negative electrode sheet 20 more appropriately. Therefore, the effect of the technology disclosed herein can be exhibited to a high degree.

The filling layer 26 includes a thermal polymerization product of a resin having electrolyte solution swellability. Here, "resin having electrolyte solution swellability" in this specification refers to a resin having a swelling ratio with respect to an electrolyte solution of 110% or more, preferably 113% or more, for example, 110 to 200%. The swelling ratio of the resin can be obtained by the following method. That is, first, a resin material is dissolved in a predetermined solvent (for example, acetonitrile) and poured into a Petri dish made of Teflon (registered trademark). Next, the result is placed in a reduced pressure dryer and dried to obtain a sample with a thickness of about 100 μm. Next, the obtained sample is cut into predetermined areas, and an average thickness (thickness A) is measured accurately. Then, a volume (volume A) of the sample is calculated based on area×thickness A. Next, this sample is immersed in a predetermined electrolyte solution and left at a temperature of 25° C. for 5 days. After 5 days, the sample is removed from the electrolyte solution, and an average thickness (thickness B) is measured. Next, a volume (volume B) of the sample after immersion in the electrolyte solution is calculated based on area×thickness B. Then, the volume B is divided by the volume A to calculate a "swelling ratio of a resin with respect to an electrolyte solution" converted to a percentage.

As the resin having electrolyte solution swellability, for example, a polyether resin such as polyethylene oxide (PEO), polypropylene oxide (PPO), tetrafluoroethylene-perfluoroalkyl vinyl ether copolymer (PFA), polyoxyethylene alkyl ether (AE), polyoxyethylene alkyl phenyl ether (APE), polyethylene glycol (PEG), and polypropylene glycol (PPG), and an acrylic resin such as polymethylmethacrylate (PMMA), poly(meth)acrylic acid (here, (meth)acrylic acid means that acrylic acid and methacrylic acid are included), polyacrylonitrile (PAN), and polyvinyl alcohol (PVA) are exemplified. Among them, PEO is preferable. The filling layer 26 may include only the above resin component or may include components other than the resin, for example, additive components such as a plasticizer and an antioxidant.

In the filling layer 26, the above resin is thermally polymerized and crosslinked. Thereby, a network between resin members is strengthened. In addition, the compatibility between the filling layer 26 and a nonaqueous electrolyte becomes strong and it is possible to enhance an electrolyte solution holding property of the filling layer 26. For example, a swelling ratio with respect to an electrolyte solution can be increased by 5% or more, and typically 5 to 20%, for example, about 10±5%, compared to a resin before thermal polymerization and crosslinking. As a result, it is possible to further enhance electrolyte solution swellability of the filling layer 26 and it is possible to impart flexibility to the filling layer 26. Thereby, the filling layer 26 can function as a cushioning material and a distance between positive and negative electrodes can be appropriately uniformized. Thus, it is possible to appropriately prevent precipitation of substances derived from charge carriers on the negative electrode sheet 20.

Here, determination of whether the above resin is thermally polymerized can be performed by, for example, the following method. That is, first, a battery is disassembled, and a sample with a predetermined size is cut out from a member including the filling layer 26. Next, the weight of the filling layer 26 is measured and it is then left at a temperature of 25° C. for 6 hours under an inert or atmospheric atmosphere. After 6 hours, the weight of the filling layer 26 is measured again. Then, the weight obtained after being left for 6 hours is divided by the weight before being left to calculate a "weight change ratio" converted to a percentage. When the weight change ratio is approximately 5% or less, and preferably 3% or less, it can be determined that "the resin of the filling layer 26 is thermally polymerized and crosslinked."

In the filling layer 26, the thermal polymerization product of the above resin may have a structure derived from a polymerization agent used for thermal polymerization, for example, a polymerization agent such as a polymerization initiator, a chain transfer agent, and a polymerization terminator at a main chain terminal. For example, a cationic group such as an amino group derived from a polymerization agent included in a nonaqueous electrolyte of the nonaqueous electrolyte secondary battery 100 and an anionic group such as a carboxy group, a hydroxy group, a sulfo group, a sulfate group, a phosphate group, and a phosphonic acid group may be included at a main chain terminal.

A weight average molecular weight (an average molecular weight based on the weight measured by Gel Permeation Chromatography (GPC) using a standard substance) of the thermal polymerization product of the above resin is not particularly limited, and may be approximately 1000 or more, preferably 10,000 or more, for example, about 10,000 to 1,000,000. Thereby, it is possible to further enhance an electrolyte solution holding property in the filling layer 26 and the effect of the technology disclosed herein can be stably exhibited to a higher degree.

A weight per unit area of the filling layer 26 is not particularly limited, and may be approximately 0.01 mg/cm$^2$ or more, and typically 0.1 mg/cm$^2$ or more, for example, 0.2 mg/cm$^2$ or more. Thereby, the effect of the technology disclosed herein can be exhibited to a higher degree. An upper limit value of the weight per unit area is not particularly limited, and typically, it is smaller than a weight per unit area of the positive electrode active material layer 14 or the negative electrode active material layer 24 and may be approximately 10 mg/cm$^2$ or less, for example, 5 mg/cm$^2$ or less.

The thickness of the filling layer 26 is not particularly limited, and it is typically thinner than the thickness of the positive electrode active material layer 14 of the positive electrode sheet 10 or the negative electrode active material layer 24 of the negative electrode sheet 20. The thickness of the filling layer 26 may be thinner than the thickness of a resin base material 32 or a heat resistant layer 34 of the separator sheet 30. The thickness of the filling layer 26 may be, for example, approximately 0.01 μm or more, for example, 0.05 μm or more, and approximately 5 μm or less, for example, 1 μm or less.

The separator sheet 30 is arranged between the positive electrode sheet 10 and the filling layer 26 on the negative electrode sheet 20. The separator sheet 30 insulates the positive electrode active material layer 14 and the negative electrode active material layer 24. The separator sheet 30 is porous so that charge carriers included in a nonaqueous electrolyte can pass therethrough. The separator sheet 30 stores a nonaqueous electrolyte in pores, and forms an ion conduction path between the positive electrode active material layer 14 and the negative electrode active material layer 24.

The separator sheet 30 includes the band-like resin base material 32 and the heat resistant layer (HRL layer) 34 formed on a surface thereof. However, the separator sheet 30 may not include the heat resistant layer 34. In the present embodiment, the heat resistant layer 34 is arranged to face the negative electrode sheet 20. However, the heat resistant layer 34 may be arranged to face the positive electrode sheet 10. As the resin base material 32, for example, a porous resin sheet (film) made of a polyolefin resin such as polyethylene (PE) and polypropylene (PP), a polyvinyl chloride resin, a polyvinyl acetate resin, a polyimide resin, a polyamide resin, and celluloses and the like are exemplified.

The heat resistant layer 34 includes inorganic compound particles (inorganic filler) such as alumina. The heat resistant layer 34 has heat resistance and an insulation property. When the heat resistant layer 34 is provided, for example, even if the temperature inside the nonaqueous electrolyte secondary battery 100 exceeds a melting point of a resin included in the resin base material 32 and the resin base material 32 shrinks and breaks, it is possible to prevent short circuiting between the positive electrode sheet 10 and the negative electrode sheet 20.

The thickness of the resin base material 32 is not particularly limited, and may be approximately 5 μm or more, for example, 10 μm or more, and approximately 50 μm or less, preferably 30 μm or less, for example, 25 μm or less. The thickness of the heat resistant layer 34 is not particularly limited, and may be approximately 0.5 μm or more, for example, 1 μm or more, and approximately 20 μm or less, preferably 10 μm or less, for example, 5 μm or less.

The nonaqueous electrolyte typically includes a nonaqueous solvent and a supporting salt. The nonaqueous electrolyte is typically in a liquid state in a temperature range (for example, in a range of −10° C. to +50° C.) in which the nonaqueous electrolyte secondary battery 100 is generally used. As the nonaqueous solvent, for example, nonaqueous solvents such as carbonates, esters, ethers, nitriles, sulfones, and lactones are exemplified. Among them, carbonates such as ethylene carbonate (EC), diethyl carbonate (DEC), dimethyl carbonate (DMC), and ethyl methyl carbonate (EMC) are preferable. The supporting salt dissociates in a nonaqueous solvent and charge carriers are generated. As the supporting salt, a lithium salt, a sodium salt, a magnesium salt, and the like are exemplified. Among them, a lithium salt such as $LiPF_6$ or $LiBF_4$ is preferable.

A polymerization agent that is used when the resin of the filling layer 26 is thermally polymerized and crosslinked, for example, a polymerization initiator, a chain transfer agent (also referred to as a molecular weight regulator or a polymerization degree regulator), a polymerization terminator, and the like may remain in the nonaqueous electrolyte.

As the polymerization initiator, for example, organic peroxides such as peroxyesters, peroxidic carbonates, diacyl peroxides, dialkyl peroxides, hydroperoxides, and peroxy ketals are exemplified. Specifically, t-butyl peroxypivalate, t-hexyl peroxypivalate, t-butyl peroxy-2-ethylhexanoate, t-butyl peroxypropylcarbonate, t-butyl peroxylaurate, t-butyl peroxybenzoate, isobutyryl peroxide, lauroyl peroxide, benzoyl peroxide, dipropyl peroxydicarbonate, diisopropyl peroxydicarbonate, t-butyl hydroperoxide, 1,1-bis(t-butylperoxy)-2-methylcyclohexane, 1,1-bis(t-butylperoxy)cyclohexane, 1,1-bis(t-butylperoxy)-3,3,5-trimethylcyclohexane, and the like are exemplified.

As other polymerization initiators, for example, azo compounds such as 2,2'-azobisisobutyronitrile, 2,2'-azobis(2-amidinopropane)dihydrochloride, 2,2'-azobis(2,4-dimethylvaleronitrile), 2,2'-azobis(2-methylbutyronitrile), 1,1'-azobis (cyclohexane-1-carbonitrile), 2,2'-azobis(2,4,4-trimethylpentane), and dimethyl 2,2'-azobis(2-methylpropionate) are exemplified.

As the chain transfer agent, an alkyl mercaptan, benzyl mercaptan, glycidyl mercaptan, thioglycolic acid, 3-mercaptopropionic acid, 2-mercaptoethanol, benzyl alcohol, α-methylbenzyl alcohol, and thiophenols which have 1 to 15 carbon atoms, for example, α-methyl styrene dimer (α-methylstyrene dimer, 2,4-diphenyl-4-methyl-1-pentene), n-octyl mercaptan, n-lauryl mercaptan, t-dodecyl mercaptan, and the like are exemplified.

As the polymerization terminator, for example, a carboxylic acid having no hydroxy group such as caproic acid, lauric acid, stearic acid, and methoxyacetic acid, and a hydroxy acid such as hydroxylamine sulfonic acid, hydroxydimethylbenzenethiocarboxylic acid, and hydroxydibutylbenzenethiocarboxylic acid are exemplified.

Furthermore, the nonaqueous electrolyte may include, for example, a gas generating agent such as biphenyl (BP) and cyclohexylbenzene (CHB), a film forming agent such as an oxalato complex compound containing boron atoms and/or phosphorus atoms and vinylene carbonate (VC), various additives such as a dispersant and a thickener, and the like.

Figure 4:
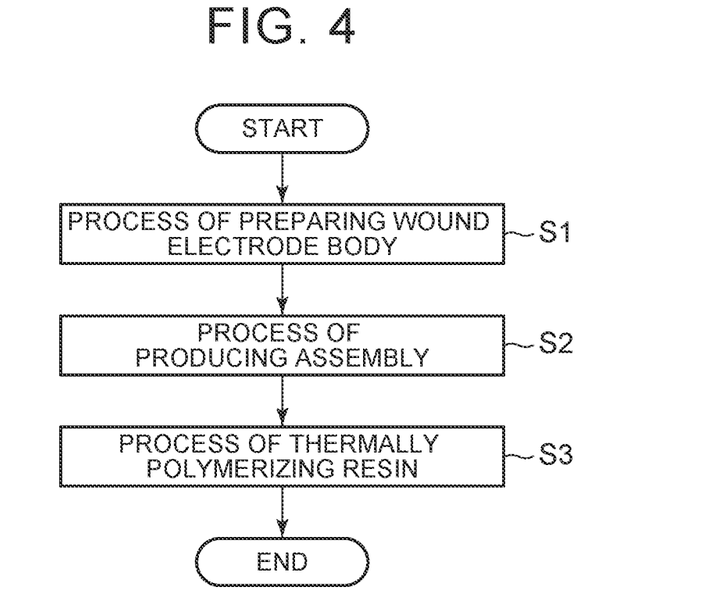
FIG. 4 is a flowchart showing a production method according to an embodiment.

For example, the nonaqueous electrolyte secondary battery 100 can be produced according to procedures shown in FIG. 4. A production method shown in FIG. 4 includes a process of preparing a wound electrode body (Step S1), a process of producing an assembly (Step S2), and a process of thermally polymerizing a resin (Step S3). Here, a general process of producing a battery may be the same as in the related art.

(Step S1) In the process of preparing a wound electrode body, a flat wound electrode body including a precursor of the filling layer 26 is prepared. For example, first, the positive electrode sheet 10 including the positive electrode current collector 12 and the positive electrode active material layer 14 is prepared. In addition, the negative electrode sheet 20 which includes the negative electrode current collector 22 and the negative electrode active material layer 24 and is integrated with the precursor of the filling layer 26 is prepared. In addition, the separator sheet 30 including the resin base material 32 and the heat resistant layer 34 is prepared. For example, the positive electrode sheet 10 can be produced by preparing a positive electrode paste containing a positive electrode active material, applying it to a surface of the band-like positive electrode current collector 12, and drying it. For example, the negative electrode sheet 20 can be produced by preparing a negative electrode paste containing a negative electrode active material, applying it to a surface of the band-like negative electrode current collector 22, and drying it. For example, the precursor of the filling layer 26 on the negative electrode sheet 20 can be produced by preparing a paste containing a resin having electrolyte solution swellability, applying it to a surface of the negative electrode active material layer 24, and drying it. For example, the separator sheet 30 can be produced by preparing a paste containing an inorganic filler, applying it to a surface of the band-like resin base material 32, and drying it.

Next, the positive electrode sheet 10 and the negative electrode sheet 20 including the precursor of the filling layer 26 are laminated with the separator sheet 30 therebetween and wound in the longitudinal direction to produce a cylindrical wound electrode body. The precursor of the filling layer 26 faces the separator sheet 30. The precursor of the filling layer 26 is interposed between the negative electrode sheet 20 and the separator sheet 30. Next, the cylindrical wound electrode body is pressed and bent to be flat. Thereby, the flat wound electrode body can be produced.

(Step S2) In the process of producing an assembly, the wound electrode body obtained in Step S1 is accommodated in the battery case 50 together with a nonaqueous electrolyte. In this case, the nonaqueous electrolyte includes a polymerization agent used when a resin included in the precursor of the filling layer 26 is thermally polymerized, for example, a polymerization initiator, a chain transfer agent, a polymerization terminator, or the like. The polymerization agent can be appropriately selected from among known agents described above or conventional agents. An amount of polymerization agent used may be an amount that is generally used. An amount of polymerization agent used may be, for example, approximately 0.005 to 1 parts by mass, for example, about 0.01 to 1 parts by mass, with respect to 100 parts by mass of a resin component included in the precursor of the filling layer 26 and also may be approximately 0.001 to 5 mass %, typically 0.01 to 3 mass %, for example, about 1 to 3 mass %, when there is 100 mass % of the nonaqueous electrolyte in total. Thereby, it is possible to produce the assembly. Here, the assembly may be unsealed or sealed. When the assembly is sealed, it is possible to enhance a handling property and workability when the resin is thermally polymerized in the following step.

(Step S3) In the process of thermally polymerizing a resin, the assembly obtained in Step S2 is warmed, and the resin included in the precursor of the filling layer 26 is thermally polymerized. For example, the assembly is aged under a temperature environment at 40° C. or higher for a predetermined time. The aging conditions, for example, a temperature and a time, can be appropriately set according to the type of a resin, a type of a polymerization agent used, and the like. The aging temperature is not particularly limited, and may be typically 40 to 80° C., for example, about 60 to 80° C. The aging time can be set based on, for example, the aging temperature, and a 1 hour half-life temperature of the polymerization agent. Thereby, it is possible to produce the nonaqueous electrolyte secondary battery 100 including the filling layer 26 containing a thermal polymerization product of a resin having electrolyte solution swellability between the negative electrode sheet 20 and the separator sheet 30.

Here, the filling layer 26 is provided on the negative electrode sheet 20 in the present embodiment, but the present disclosure is not limited thereto. The filling layer disclosed herein may be arranged between the negative electrode sheet and the separator sheet. The filling layer may be provided on, for example, the separator sheet. Alternatively, a filling layer that is in a state of being independent of the negative electrode sheet and the separator sheet may be arranged between the negative electrode sheet and the separator sheet.

Second Embodiment

Figure 5:
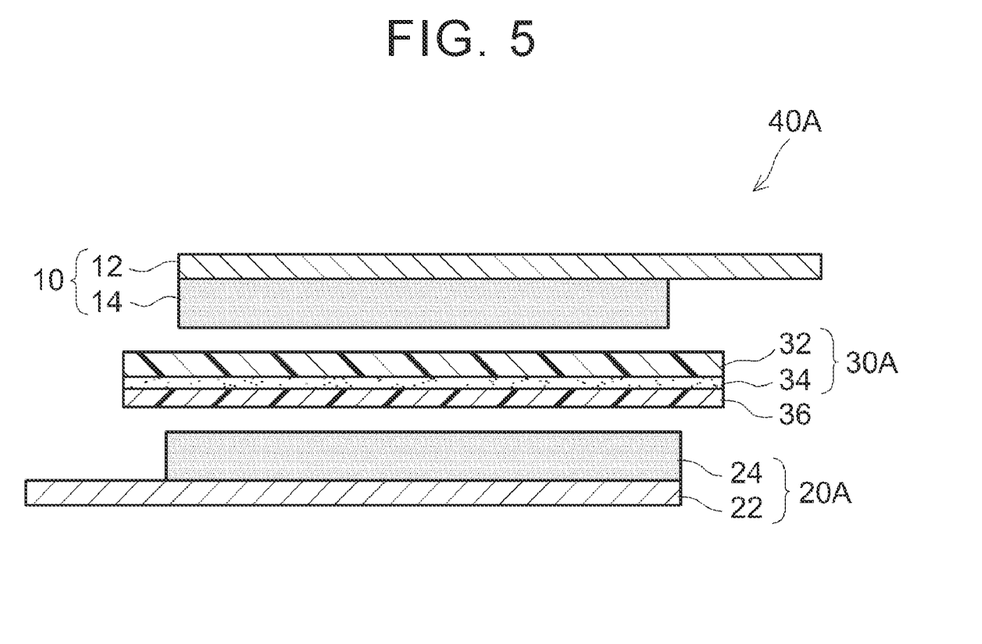
FIG. 5 is a schematic diagram showing a partial cross-sectional structure of a wound electrode body according to another embodiment.

FIG. 5 is a schematic diagram showing a partial cross-sectional structure of a wound electrode body 40A according to a second embodiment. The wound electrode body 40A of the second embodiment includes a positive electrode sheet 10, a negative electrode sheet 20A, and a separator sheet 30A. The positive electrode sheet 10 is the same as in the first embodiment. The negative electrode sheet 20A includes the negative electrode current collector 22 and the negative electrode active material layer 24. Unlike the first embodiment, no filling layer is provided on the negative electrode sheet 20A. The separator sheet 30A includes the resin base material 32 and the heat resistant layer 34. The separator sheet 30A includes a filling layer 36 on a surface on the side that does not face the resin base material 32 of the heat resistant layer 34. In other words, the filling layer 36 is physically adhered to and integrated with the heat resistant layer 34 of the separator sheet 30A. The filling layer 36 is arranged on the side that faces the negative electrode sheet 20A.

Third Embodiment

Figure 6:
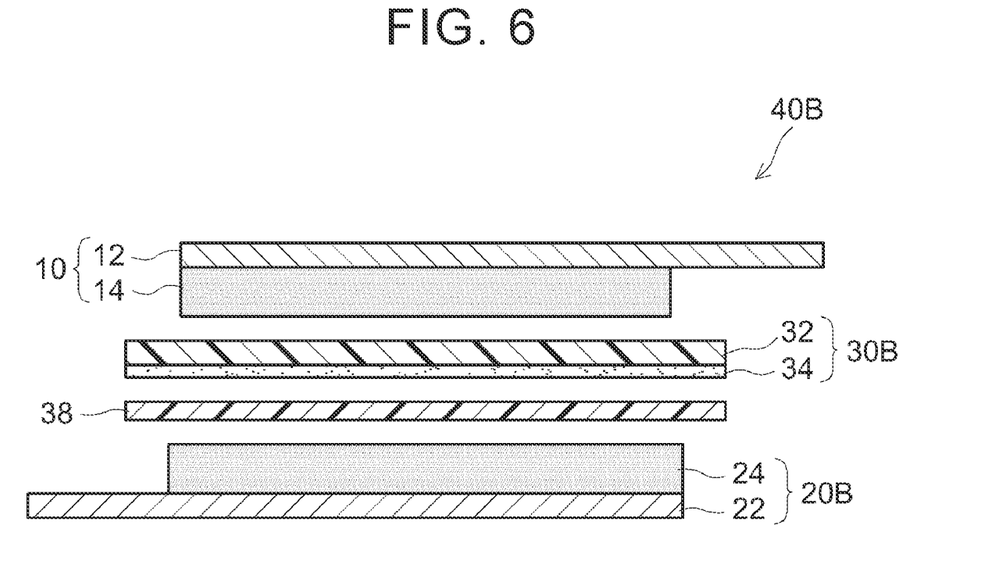
FIG. 6 is a schematic diagram showing a partial cross-sectional structure of a wound electrode body according to another embodiment.

FIG. 6 is a schematic diagram showing a partial cross-sectional structure of a wound electrode body 40B according to a third embodiment. The wound electrode body 40B of the third embodiment includes a positive electrode sheet 10, a negative electrode sheet 20B, a separator sheet 30B and a filling sheet 38. The positive electrode sheet 10 is the same as in the first embodiment. The negative electrode sheet 20B includes the negative electrode current collector 22 and the negative electrode active material layer 24. Unlike the first embodiment, no filling layer is provided on the negative electrode sheet 20B. The separator sheet 30B is the same as in the first embodiment. The filling sheet 38 that is in a state of being independent of the negative electrode sheet 20B and the separator sheet 30B may be arranged between the negative electrode sheet 20B and the separator sheet 30B.

The nonaqueous electrolyte secondary battery 100 can be used for various applications, and when the wound electrode body 40 is included, a high energy density and a high capacity can be realized. In addition, when the wound electrode body 40 has the configuration described above, precipitation resistance (for example, Li precipitation resistance) with respect to substances derived from charge carriers is enhanced compared to products in the related art. Therefore, it can be appropriately used as, for example, a power source (drive power supply) of a hybrid vehicle or an electric vehicle using such characteristics.

Several examples related to the present disclosure will be described below but the present disclosure is not intended to be limited to such specific examples.

<Production of a battery of Comparative Example 1>

$LiNi_{1/3}Co_{1/3}Mn_{1/3}O_2$ (NCM, average particle size of 5 μm) as a positive electrode active material, polyvinylidene fluoride (PVdF) as a binder, and acetylene black (AB) as a conductive material were weighed out such that the mass ratio (solid content ratio) was NCM:PVdF:AB=92:3:5, and mixed into N-methyl-2-pyrrolidone (NMP) to prepare a positive electrode paste. The positive electrode paste was applied to a band-like aluminum foil with a thickness of 15 μm, dried, and pressed to a predetermined thickness to produce a positive electrode sheet including a positive electrode active material layer with a width of 100 mm.

Graphite (C, average particle size of 10 μm) as a negative electrode active material, styrene butadiene rubber (SBR) as a binder, and carboxymethyl cellulose (CMC) as a thickener were weighed out such that the mass ratio (solid content ratio) was C:SBR:CMC=100:0.5:0.5 and mixed into water to prepare a negative electrode paste. The negative electrode paste was applied to a band-like copper foil with a thickness of 10 μm, dried and then pressed to a predetermined thickness to produce a negative electrode sheet including a negative electrode active material layer with a width of 105 mm.

As a separator sheet, a porous sheet including a heat resistant layer (HRL layer, thickness of 4 μm) containing a ceramic on a surface of a resin base material (total thickness of 24 μm) having a 3-layer (PP/PE/PP) structure in which a polypropylene layer (PP layer) was laminated on both sides of a polyethylene layer (PE layer) was prepared. As a nonaqueous electrolyte solution, a solution in which $LiPF_6$ as a supporting salt was dissolved at a concentration of 1.0 M in a solvent mixture containing ethylene carbonate (EC), dimethyl carbonate (DMC), and ethyl methyl carbonate (EMC) at the volume ratio of EC:DMC:EMC=3:3:4 was prepared.

The above positive electrode sheet and negative electrode sheet were laminated with the separator sheet therebetween, wound, and additionally pressed and bent to be flat to produce a flat wound electrode body. The positive electrode current collector plate was welded to the positive electrode sheet of the wound electrode body, the negative electrode current collector plate was welded to the negative electrode sheet thereof, and these were enclosed in a battery case together with the nonaqueous electrolyte. Thereby, the assembly was obtained. The assembly was left for a predetermined time, and the nonaqueous electrolyte solution was impregnated into the wound electrode body. Then, charging was performed to a predetermined voltage, and aging was performed at 60° C. in the charged state. Thus, the battery of Comparative Example 1 was produced.

<Production of a battery of Comparative Example 2> Separately from the separator sheet, a porous sheet made of polyethylene (PE, swelling ratio with respect to an electrolyte solution: 101%) was prepared. Then, a battery of Comparative Example 2 was produced in the same manner as in Comparative Example 1 except that the PE porous sheet was interposed between the separator sheet and the negative electrode sheet when the above wound electrode body was produced.

<Production of a battery of Comparative Example 3> Separately from the separator sheet, a porous sheet made of polypropylene (PP, swelling ratio with respect to an electrolyte solution: 105%) was prepared. Then, a battery of Comparative Example 3 was produced in the same manner as in Comparative Example 1 except that the PP porous sheet was interposed between the separator sheet and the negative electrode sheet when the above wound electrode body was produced.

<Production of a battery of Comparative Example 4> Separately from the separator sheet, a porous sheet made of polyethylene oxide (PEO, swelling ratio with respect to an electrolyte solution: 123%) was prepared. Then, a battery of Comparative Example 4 was produced in the same manner as in Comparative Example 1 except that the PEO porous sheet was interposed between the separator sheet and the negative electrode sheet when the above wound electrode body was produced.

<Production of a battery of Example 1> A battery of Example 1 was produced in the same manner as in Comparative Example 4 except that α-methyl styrene dimer as a chain transfer agent and t-hexyl peroxypivalate (PERHEXYL (registered trademark) PV) as a polymerization initiator were additionally added at 1.1 mass % and 1.9 mass % as a percentage, respectively, to the nonaqueous electrolyte. Here, the wound electrode body of the battery of Example 1 has a configuration shown in FIG. 6.

<Production of a battery of Example 2> A polyethylene oxide layer (PEO layer) was formed on a surface of a negative electrode active material layer of a negative electrode sheet instead of using a PEO sheet. Specifically, polyethylene oxide powder was dissolved in acetonitrile to prepare a slurry having a solid fraction of 60%. This slurry was applied to the surface of the negative electrode active material layer by a spray dry method to form a PEO layer (weight per unit area of 0.5 mg/cm$^2$). Then, a battery of Example 2 was produced in the same manner as in Example 1 except that a negative electrode including the PEO layer was used in place of the PEO sheet and the negative electrode sheet. Here, a wound electrode body of the battery of Example 2 had a configuration shown in FIG. 3.

<Production of a battery of Example 3> A PEO layer was formed on a surface of an HRL layer of a separator sheet without using a PEO sheet. Specifically, in the same manner as in Example 2, the PEO layer (weight per unit area of 0.5 mg/cm$^2$) was formed on the surface of the HRL layer of the separator sheet. Then, a battery of Example 3 was produced in the same manner as in Example 1 except that a separator sheet including the PEO layer was used in place of the PEO sheet and the separator sheet. Here, a wound electrode body of the battery of Example 3 had a configuration shown in FIG. 5.

[Evaluation of space between positive and negative electrodes of separator] Cross sections of the batteries produced above were observed by X-ray CT, and a gap space between positive and negative electrodes was checked. The results are shown in Table 1. Here, in Table 1, relative values with respect to the space between positive and negative electrodes in Comparative Example 1 as a reference (1) are shown. As the value becomes higher, the space between electrodes is reduced to be smaller, and the distance between positive and negative electrodes becomes uniformized.

[Evaluation of Li precipitation resistance] Under an environment at −10° C., high rate pulse charging and discharging was repeatedly performed on the produced batteries over 1000 cycles. Pulse charging and discharging conditions were as follows. Charging was performed at a predetermined constant current value for 5 seconds, and then paused for 10 minutes. Next, discharging was performed at a predetermined constant current value for 5 seconds and then paused for 10 minutes. After the high rate pulse charging and discharging, the battery was disassembled, the negative electrode was removed, and it was checked whether Li precipitation had occurred on the negative electrode. Then, the constant current value was gradually increased, and the maximum current value among current values at which Li precipitation on the negative electrode was not observed was set as a limit current value. The results are shown in Table 1. Here, Table 1 shows values that are normalized when the limit current value of the battery of Comparative Example 1 was set as 1 (reference). When the value is higher, Li precipitation is less likely to occur and Li precipitation resistance is excellent.

[Evaluation of wrinkles of separator] The batteries of which the above evaluations were completed were disassembled and it was visually checked whether wrinkles had occurred in the separator. The results are shown in Table 1. Here, in Table 1, "yes" indicates that one or more sharp folded or wave wrinkles were observed in the separator, and "no" indicates that no wrinkles were observed in the separator.

TABLE 1

| | Filling layer | | Polymerization agent | Space between electrodes | Generation of wrinkles | Limit current value |
|---|---|---|---|---|---|---|
| | Resin | Form | | | | |
| Comparative Example 1 | | | Not included | 1 | Yes | 1 |
| Comparative Example 2 | PE | Sheet form | Not included | 0.75 | Yes | 0.83 |
| Comparative Example 3 | PP | Sheet form | Not included | 0.81 | Yes | 0.92 |
| Comparative Example 4 | PEO | Sheet form | Not included | 1.02 | Yes | 1.09 |
| Example 1 | PEO | Sheet form | Included | 1.12 | No | 1.19 |
| Example 2 | PEO | Applied to negative electrode | Included | 1.15 | No | 1.24 |
| Example 3 | PEO | Applied to separator | Included | 1.16 | No | 1.23 |

As shown in Table 1, in Comparative Examples 2 and 3, the PE or PP sheet was interposed between the negative electrode sheet and the separator sheet, and thus the space between positive and negative electrodes was larger than in Comparative Example 1, and the limit current value was also smaller than in Comparative Example 1. In other words, Li precipitation resistance decreased. In addition, in Comparative Example 4, the space between positive and negative electrodes was slightly larger and Li precipitation resistance was slightly greater than in Comparative Example 1, but wrinkles were still observed in the separator.

With respect to the comparative examples, in Examples 1 to 3, the space between positive and negative electrodes was much larger than in Comparative Example 1, and Li precipitation resistance also greatly increased. Further, no wrinkles were observed in the separator. This is thought to have been caused by the fact that, when the resin (PEO) having electrolyte solution swellability was thermally polymerized, the resin network was strengthened, an electrolyte solution holding property was enhanced, and thus the electrolyte solution swellability and flexibility of the filling layer were enhanced. Among them, in Examples 2 and 3 in which the filling layer was arranged on a surface of the negative electrode sheet or the separator sheet, Li precipitation resistance significantly increased. These results indicate the significance of the technology disclosed herein.

The present disclosure has been described above in detail, but the above embodiments and examples are only examples. The disclosure disclosed herein includes various alternations and modifications of the above specific examples.

What is claimed is:

1. A nonaqueous electrolyte secondary battery comprising:
   a flat wound electrode body that includes a positive electrode sheet, a negative electrode sheet, and a separator sheet arranged between the positive electrode sheet and the negative electrode sheet; and
   a nonaqueous electrolyte,
   wherein the wound electrode body includes a filling layer containing a thermal polymerization product of a resin having electrolyte solution swellability with a swelling ratio with respect to an electrolyte solution of 110% or more between the negative electrode sheet and the separator sheet only,
   the separator sheet and the positive electrode sheet are adjacent to each other,
   the positive electrode sheet includes a positive electrode current collector and a positive electrode active material layer, and the negative electrode sheet includes a negative electrode current collector and a negative electrode active material layer,
   the filling layer contains only the resin having electrolyte solution swellability as a resin component, and
   a thickness of the filling layer is 0.01 µm or more and 5 µm or less.

2. The nonaqueous electrolyte secondary battery according to claim 1,
   wherein the filling layer is formed integrally with at least one of the negative electrode sheet and the separator sheet.

3. The nonaqueous electrolyte secondary battery according to claim 2,
   wherein the filling layer is formed integrally with the negative electrode sheet.

4. The nonaqueous electrolyte secondary battery according to claim 2,
   wherein the filling layer is formed integrally with the separator sheet.

5. The nonaqueous electrolyte secondary battery according to claim 1,
   wherein the filling layer that is in a state of being independent of the negative electrode sheet and the separator sheet is arranged between the negative electrode sheet and the separator sheet.

6. The nonaqueous electrolyte secondary battery according to claim 1,
   wherein the nonaqueous electrolyte includes at least one of a polymerization initiator, a chain transfer agent, and a polymerization terminator.

7. The nonaqueous electrolyte secondary battery according to claim 1,
   wherein a weight average molecular weight of the thermal polymerization product of the resin having electrolyte solution swellability is 10,000 to 1,000,000.

8. The nonaqueous electrolyte secondary battery according to claim 1,
   wherein weight per unit area of the filling layer is 0.2 mg/cm2 or more.

9. The nonaqueous electrolyte secondary battery according to claim 1,
   wherein the resin having electrolyte solution swellability is polyethylene oxide.

10. A method of producing a nonaqueous electrolyte secondary battery comprising:
preparing a flat wound electrode body that includes a positive electrode sheet, a negative electrode sheet, and a separator sheet arranged between the positive electrode sheet and the negative electrode sheet;
accommodating the wound electrode body in which a filling layer including a resin having electrolyte solution swellability with a swelling ratio with respect to an electrolyte solution of 110% or more is interposed only between the negative electrode sheet and the separator sheet and a nonaqueous electrolyte in a battery case to produce an assembly, wherein the separator sheet and the positive electrode sheet are adjacent to each other, wherein the filling layer contains only the resin having electrolyte solution swellability as a resin component; and
warming the assembly in which the nonaqueous electrolyte includes at least one of a polymerization initiator, a chain transfer agent, and a polymerization terminator and thermally polymerizing the resin included in the filling layer.

11. The nonaqueous electrolyte secondary battery according to claim 1, wherein the thickness of the filling layer is 0.01 μm or more.

12. The nonaqueous electrolyte secondary battery according to claim 1, wherein a cross-linked structure is selectively formed only between the separator and the negative electrode.

13. The method of producing a nonaqueous electrolyte secondary battery according to claim 10, wherein a cross-linked structure is selectively formed only between the separator and the negative electrode.

14. The nonaqueous electrolyte secondary battery according to claim 1, wherein a thickness of the filling layer is thinner than a thickness of the negative electrode sheet and a thickness of the positive electrode sheet.

15. The nonaqueous electrolyte secondary battery according to claim 1,
wherein the filling layer consists of the thermal polymerization product of the resin having electrolyte solution swellability, and optionally at least a plasticizer or an antioxidant.

16. The method of producing a nonaqueous electrolyte secondary battery according to claim 10, wherein the filling layer consists of the thermal polymerization product of the resin having electrolyte solution swellability, and optionally at least a plasticizer or an antioxidant.

* * * * *